United States Patent [19]

Sponseller

[11] Patent Number: 4,740,129

[45] Date of Patent: Apr. 26, 1988

[54] SLICE SEPARATING AND FEEDING APPARATUS AND METHOD

[76] Inventor: Harold P. Sponseller, 1446 Reynolds Rd., Maumee, Ohio 43537

[21] Appl. No.: 923,477

[22] Filed: Oct. 27, 1986

[51] Int. Cl.[4] .............................................. B65G 59/00
[52] U.S. Cl. .................................. 414/330; 99/450.4; 198/343; 198/476.1; 198/693; 271/18.3; 271/95; 271/150; 414/118; 414/123; 414/736; 414/786
[58] Field of Search ............... 414/118, 120, 123, 128, 414/129, 330, 736, 786; 198/343, 476.1, 692, 693; 271/18.3, 95, 148, 150, 155; 99/450.1, 450.4

[56] References Cited

U.S. PATENT DOCUMENTS

| | | | |
|---|---|---|---|
| 2,611,470 | 9/1952 | Rudolph | 414/129 X |
| 2,915,308 | 12/1959 | Matzen | 271/95 X |
| 3,302,946 | 2/1967 | Anderson | 271/95 |
| 3,364,878 | 1/1968 | Kobori et al. | 99/450.4 |
| 4,338,836 | 7/1982 | Kuchler | 271/18.3 X |
| 4,518,301 | 5/1985 | Grewnwell | 414/330 X |

OTHER PUBLICATIONS

"Horizontal Timing Belt Driven Feed Hopper", IBM Technical Disclosure Bulletin, vol. 13, No. 2, Jul. 1970, p. 438.

*Primary Examiner*—Leslie J. Paperner
*Attorney, Agent, or Firm*—Thomas A. Meehan

[57] ABSTRACT

A device for separating slices of bread from sliced loaves of bread and for transferring the separated slices one by one to a conveyor for further processing. The device incorporates an inclined, intermittently driven infeed conveyor for conveying the slices of bread in generally upright positions and in surface-to-surface contact with one another to a separating and transfer position. The separating and transfer position incorporates a primary rotatable member which rotates about its horizontally extending central axis. The primary rotatable member carries a plurality, for example, four, of secondary rotatable members, each of which rotates about its longitudinal central axis, which is spaced outwardly from and extends generally parallel to, the longitudinal central axis of the primary rotatable member. Each secondary rotatable member has a plurality of pins or wires projecting outwardly therefrom, and the pins or wires are adapted to permit the secondary rotatable member to serve as a transfer element for a slice of bread, after the slice of bread has been impaled onto such pins or wires. A drive mechanism is provided to rotate each secondary rotatable member in an opposite direction, and at a predetermined rate of rotational speed relative to the primary rotatable member.

24 Claims, 2 Drawing Sheets

SLICE SEPARATING AND FEEDING APPARATUS AND METHOD

BACKGROUND OF THE INVENTION

1. Field Of The Invention

This invention relates to an apparatus and a method for separating soft, spongy, planar materials in stacks of materials, for example, sliced bread in loaves, and for individually feeding such materials in sequence for the further processing of such materials, for example, in the case of bread slices, for the preparation of sandwiches therefrom.

2. Description Of The Prior Art

As is explained in prior U.S. Pat. Nos. 1,964,085 (F. R. Schmitt) and 2,611,470 (E. A. Rudolph), it is often desirable to be able to mechanically separate individual slices of bread from sliced loaves of bread and to transfer such slices, in sequence, to a conveyor for further processing. The mechanical handling steps involved in the separation and transferring of bread slices involve certain unique problems that arise by virtue of the compressibility and the lack of rigidity of a slice of bread, especially a slice of freshly baked bread. Thus, it is difficult to handle a slice of freshly baked bread by gripping the bread, since the act of gripping the bread will crush the bread, and it is difficult to mechanically handle a slice of bread in any way in which the slice of bread is in an upright, unsupported condition, since, in such condition, the slice of bread is likely to buckle. Further, in any machine for mechanically handling a slice of bread, each bread slice is usually subjected to inertial forces by virtue of the changes in direction of the slice of bread as it progresses along its path of travel through the machine, and these inertial forces normally increase as the speed of the machine is increased, which is commonly done to increase the productivity of the machine, to the point where the inertial forces acting on the slice of bread are sufficient to cause the slice of bread to be moved from its desired position in the machine. Further, unless a slice of bread is stale or very dry, in which condition it is probably already unsaleable, it is normally rather sticky, and does not readily slide with respect to plates, or other mechanical elements that are frequently used in standard machine design practice. The use of vacuum has been proposed as a way to handle limp, fresh bread, but this accelerates the replacement of the carbon dioxide trapped in the bread with oxygen and water vapor which causes the bread to become stale.

SUMMARY OF THE INVENTION

According to the present invention, there is provided a new and improved device for mechanically and gently separating soft spongy planar materials in stacks of such materials, for example, slices of bread in sliced loaves of bread, and for transferring the separated slices in precisely timed sequence to a conveyor for further processing, without any crushing or other serious damage to the bread. The separator incorporates an inclined, intermittently driven infeed conveyor, which is driven by an electro-optically controlled direct current stepping motor, for conveying the slices of bread in generally upright, mutually self-supporting positions, in surface-to-surface contact with one another, to a separating and transfer device. The separating and transfer device incorporates a primary rotatable member which rotates about its central axis. The primary rotatable member carries a plurality, four, for example, of secondary rotatable members, each of which rotates about its longitudinal central axis, which is based outwardly from and extends generally parallel to the longitudinal central axis of the primary rotatable member. Each secondary rotatable member, which is generally in the form of a slotted drum, has a portion of its outer surface made up of a series of pins or wires which are adapted to permit the secondary rotatable member to serve as a transfer element for a slice of bread, after the slice of bread has been impaled onto such pins or wires. A drive mechanism which is driven by the rotation of the primary rotatable member is provided to rotate each secondary rotatable member in an opposite direction and at a predetermined rate of rotational speed relative to the primary rotatable member, so that the wires or the pins of each secondary rotatable member always present themselves, first at a pick-up station adjacent the infeed station to pick up a slice of bread from a loaf of bread slices on the inclined infeed conveyor, and to thereafter present the slice of bread at a discharge point that is arcuately removed in the path of travel of the primary rotatable member, for example, at a take-away conveyor, in such a manner that a slice of bread can be readily transferred from the pins or wires on which it is impaled at the desired time and location. Each secondary rotatable member has a plurality of axially spaced apart slots therein, and oscillatable strip-off fingers are provided that interengage (pass within) the slots of each such secondary rotatable member at the take-away conveyor to positively strip the slice of bread from the secondary rotatable member at the discharge point. The rotational speed of each secondary rotatable member is controlled relative to that of the primary rotatable member so that the surface that carries the bread slice is traveling at zero absolute velocity at the bread slice pick-up station and at the discharge point, thus, avoiding the imposition of inertial forces on the bread slice during pick-up and discharge, and avoiding the turning of the bread during pick-up and discharge and the inertial forces that would result therefrom, regardless of the speed of operation of the device. The use of a counterrotating secondary rotatable member to pick-up and discharge the bread slice, which is traveling at zero absolute velocity, as described, also ensures that the relative motion of the pins or wires on the secondary rotatable member with respect to the bread slice being picked-up or discharged is predominately normally of the bread slice with little or no relative motion parallel to the bread slice, thus avoiding the tearing of the bread slice by the pins or wires. Further, the use of an electro-optically controlled direct current stepping motor ensures that the leading surface of the bread slice to be picked up by the separating and transfer device is always positioned at a fixed location, regardless of the original thickness of the slices of bread in the loaf of bread, and regardless of any crushing or collapsing of any such bread slices during or prior to the infeeding of such bread slices to the separating and transfer device.

Accordingly, it is an object of the present invention to provide an improved device for separating slices of bread from sliced loaves of bread and for transferring the separated slices in sequence to a conveyor for further processing. It is a further object of the present invention to provide a device for separating slices of bread from sliced loaves of bread and for transferring the separated slices in sequence to a conveyor for further processing, in which each such bread slice is travelling at or virtually at zero absolute velocity when it is picked up by the separating and transfer device and when it is discharged from the separating and transfer device. It is also an object of the present invention to provide a device for separating slices of bread from sliced loaves of bread and for transferring the separated slices in sequence to a conveyor for further processing in which the bread is engaged by impaling it on a plurality of pins or wires, to thereby avoid the need to compressively grip the bread during its handling by the separating and transfer device, and while the relative motion of the pins or wires with respect to the surface of the bread is normally thereof.

For further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 1:
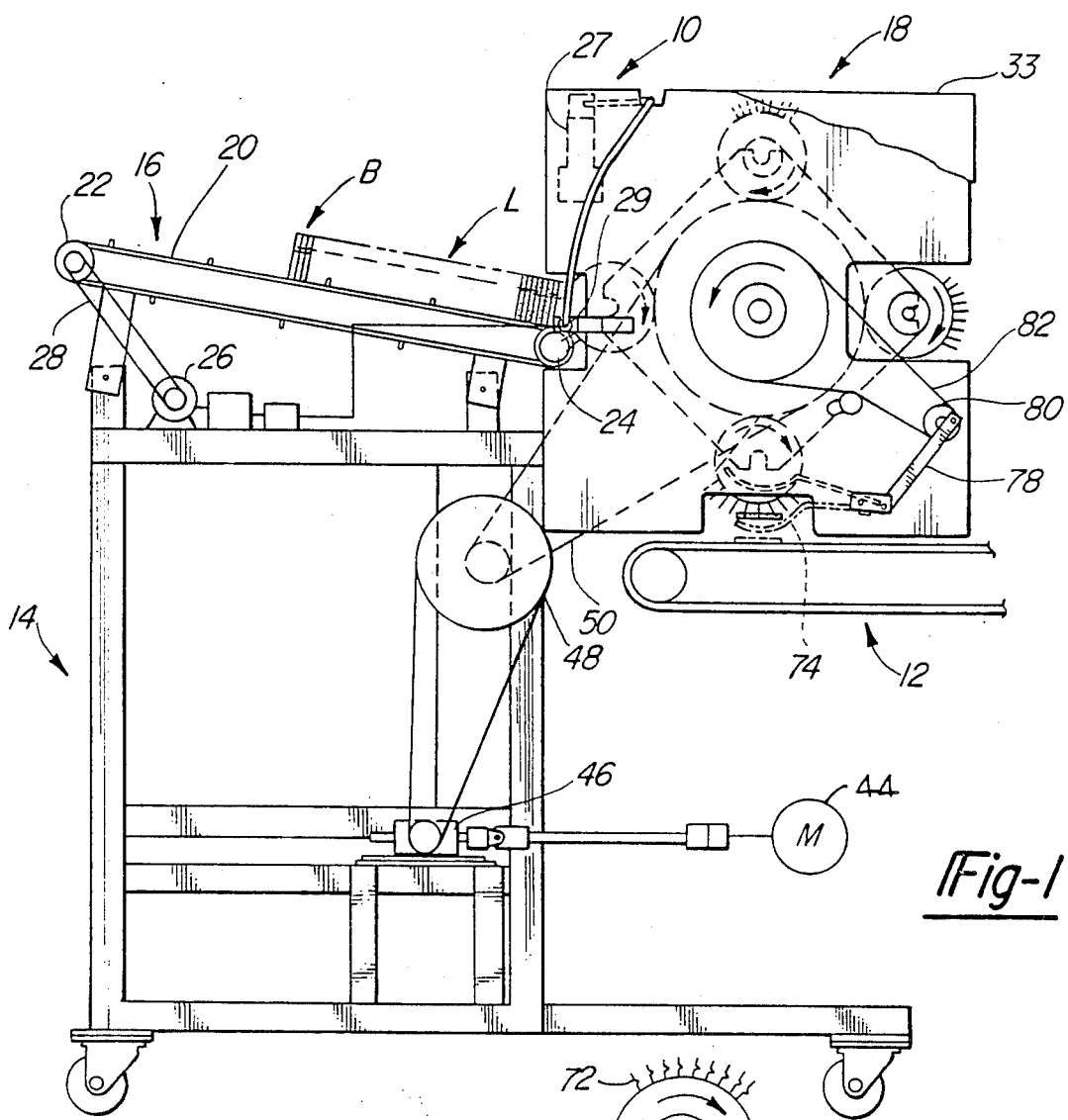
FIG. 1 is an elevational view of the preferred embodiment of a bread slice separating and transfer machine according to the present invention.
Figure 2:
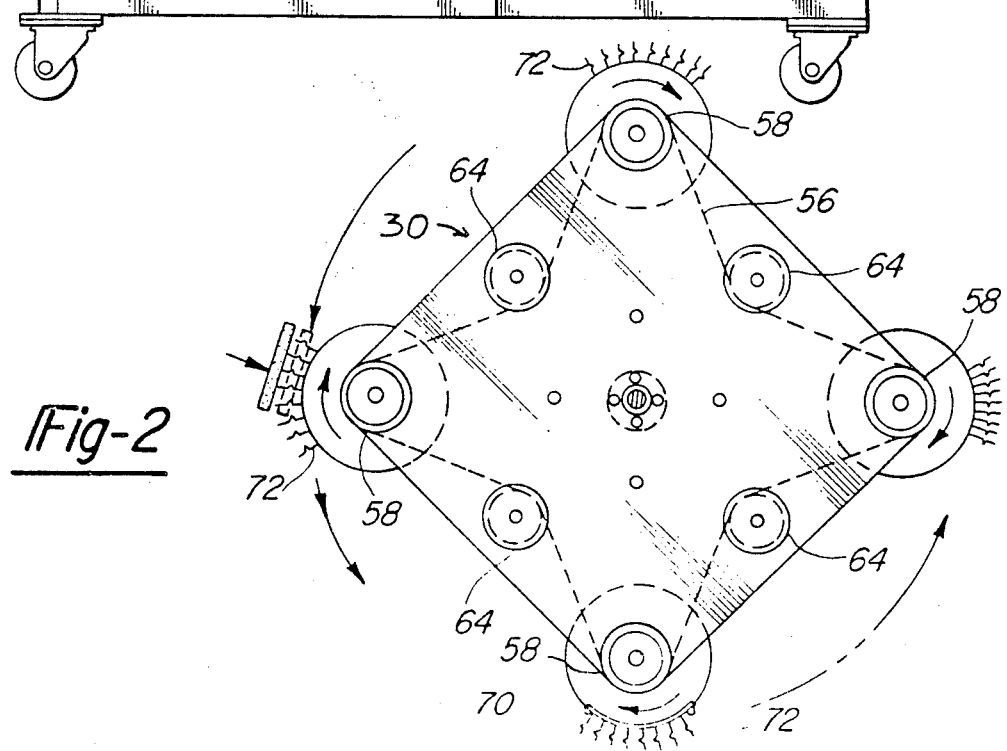
FIG. 2 is a schematic view, at an enlarged scale, of a portion of the separating and transfer device of FIG. 1.
Figure 3:
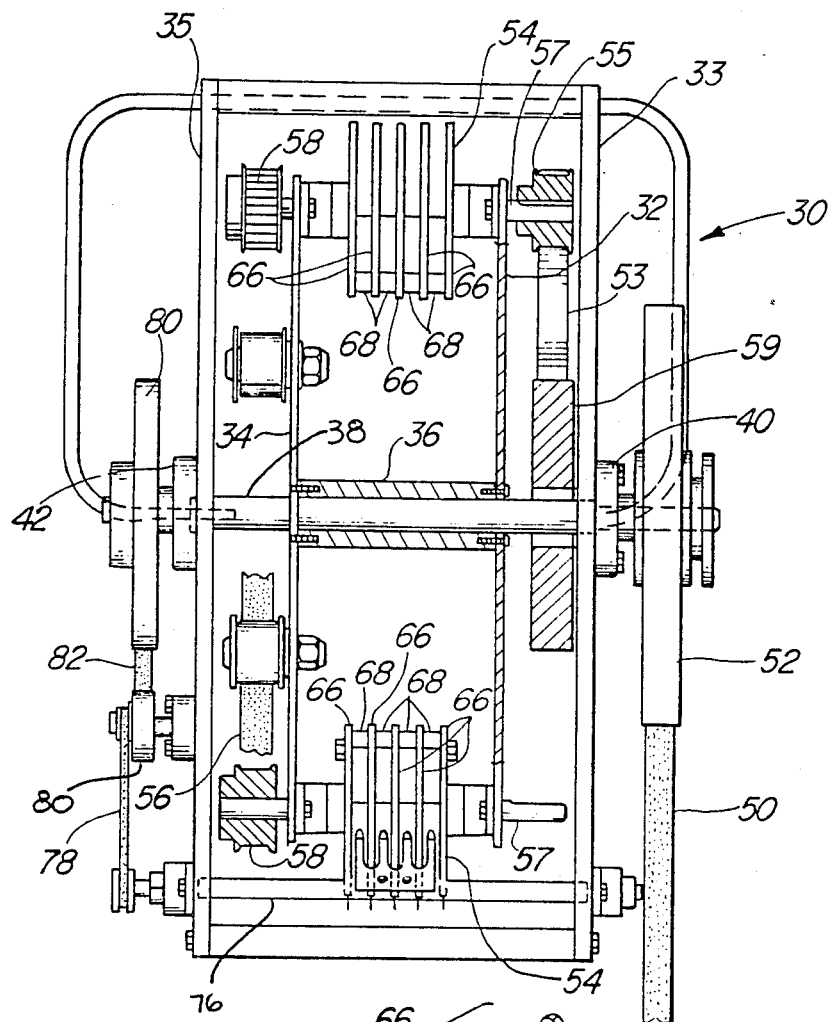
FIG. 3 is a side elevational view, partly in section, of the bread slice separating and transfer device of FIGS. 1 and 2.

A bread slice separating and transfer device is indicated generally by reference numeral 10, and serves to transfer, in sequence, slices of bread B in a loaf L to a take-out conveyor, shown fragmentarily and indicated generally by reference numeral 12 in FIG. 1, for further processing, for example, for the preparation of sandwiches from such bread slices B, or for the wrapping of bread slices B in individual bread servings such as those which are served in hospitals, schools, and other institutions. The bread slice separating and transfer device 10 includes a wheel-mounted frame portion, indicated generally by reference number 14, an infeed conveyor portion, indicated generally by reference numeral 16 and a separating and transfer portion indicated generally by reference numeral 18.

The infeed conveyor portion 16 of the bread slice separating and transfer device 10 includes an endless conveyor belt 20 that is trained around driven and drive rollers 22 and 24, respectively, and the upper flight of the endless conveyor belt 20 advances from left to right, as shown in the drawing, with a slight downwardly inclined orientation in the direction of travel, to ensure that the bread slices B are successively supported in upright positions at the forward end of the infeed conveyor portion 16, namely the portion of the infeed conveyor portion 16 that is adjacent the separating and transfer portion 18 of the bread slice separating and transfer device 10. The driven roller 22 of the infeed conveyor portion 16 is driven by a motor 26 through a drive belt 28 and is, preferably, intermittently driven through an electro-optical control device 27 that is operatively connected to a sensing device 29 so that the lead surface of the lead bread slice B is always at a fixed position for pick-up by the separating and transfer portion 18 of the bread slice separating and transfer device 10. Preferably, the motor 26 is a direct current stepping motor, and the use of such an electro-optically controlled direct current stepping motor overcomes any subsequent operating problems that may arise due to any variations in the thicknesses of the bread slices B in the loaf L, arising either by virtue of variations in the cutting dimensions of the bread slices B, or by virtue of any subsequent crushing or collapsing of the bread slices B, an important factor since freshly baked bread slices are quite crushable or collapsible even under relatively low loads. Electro-optically controlled direct current stepping motors of this type are commercially available from The Superior Electric Company in Bristol, Conn., and, therefore, will not be further described in connection with this application. If desired, the infeed conveyor 16 may also include opposed side engaging conveyor belts, not shown, for engaging the bread slices B in the loaf L as they are advanced toward the separating and transfer portion 18.

The separating and transfer portion 18 of the bread slice separating and transfer device 10 includes a primary rotatable member, generally indicated by reference numeral 30, which, in the orientation shown in the drawing, is rotatable in a counter-clockwise direction about a horizontally extending axis that extends transversely of the direction of movement of the bread slices B on the infeed conveyor portion 16 of the bread slice and separating and transfer device 10. The primary rotatable member 30 includes first and second spaced apart plates 32 and 34 which are positioned between spaced-apart stationary plates 33 and 35 that are secured to the frame portion 14 and which are attached to a common hub 36. The hub 36, in turn, is connected to a driven shaft 38. The shaft 38 is journaled in opposed bearing blocks 40 and 42, which are attached to the plates 33 and 35, respectively, and is rotatably driven by a motor 44 through a right angle gear drive 46 and a belt drive 48 that includes a cogged, non-slip timing drive belt 50 which drivingly engages a pulley 52 that is secured to the shaft 38.

The primary rotatable member 30 carries a multiplicity, shown as 4, of secondary rotatable members 54 at circumferentially evenly spaced locations around the primary rotatable member 30 that are disposed radially outwardly from the central axis of rotation of the primary rotatable member 30, which extends through the shaft 38. Each of the secondary rotatable members 54 is journaled in the plates 32 and the 34 for rotation about its longitudinal central axis which is spaced from, and extends parallel to, the longitudinal central axis of the primary rotatable member 30. Each secondary rotatable member 54 is rotated in a clockwise direction around its longitudinal central axis, and, for the pick-up of a bread slice B at the nine o'clock position and the discharge of such bread slice B at the six o'clock position, as shown, each secondary rotatable member 54 is rotated at a rate of speed that is three times as great as the rotational rate of speed of the primary rotatable member 30. One of such secondary rotatable members 54, shown as the rotatable member at the twelve o'clock position, is so rotated by a non-slip, cogged-timing belt 53 that is trained around a pulley 55, which is fixedly attached by keying or by a Tran-Torque adjustable bushing, to a shaft portion 57 of such secondary rotatable member, and around a non-rotating pulley 59 which is fixedly attached to the plate 33, thus, inherently imparting counterrotating movement of such secondary rotatable member 54 relative to the primary rotatable member 30 upon the rotation of the primary rotatable member 30. The rotation of the remaining secondary rotatable members 54 is synchronized relative to the rotation of the secondary rotatable member 54 that carries the pulley 55 and to the primary rotatable member 30 by driving each such other secondary rotatable member 54 by means of a non-slip, cogged timing belt 56 that is trained around a pulley 58 which is fixedly attached to the shaft portion 57 of each secondary rotatable member 54 of the bread slice separating and transfer device 10. The belt 56 is also trained around a belt take up member 64 that is positioned intermediate each adjacent pair of secondary rotatable members 54 to maintain a suitable degree of tension of all portions in the belt 56. Thus, by virtue of the otherwise undriven belt 56 and its relationship to the secondary rotatable member 54 which is driven through the belt 53 and the pulley 55, each of the other secondary rotatable members 54 is caused to rotate in the correct direction and at the correct rate of rotational speed at all times and regardless of the rate of rotation speed of the primary rotatable member 30. Further, because each secondary rotatable member 54 is rotating clockwise and because the primary rotatable member 30 is rotating counter-clockwise, and when the angular velocity of the primary rotatable member and the angular velocity of the secondary rotatable members 54 are properly controlled, the instantanious absolute velocity of the radially outermost point of each secondary rotatable member 54, at the nine o'clock pick-up point and at the six o'clock discharge point, can be maintained at zero, a fact which greatly facilitates the transfer of a bread slice B to the secondary rotatable member 54 at the nine o'clock pick-up point and the transfer of a bread slice B from such second rotatable member 54 at the six o'clock discharge point.

Figure 4:
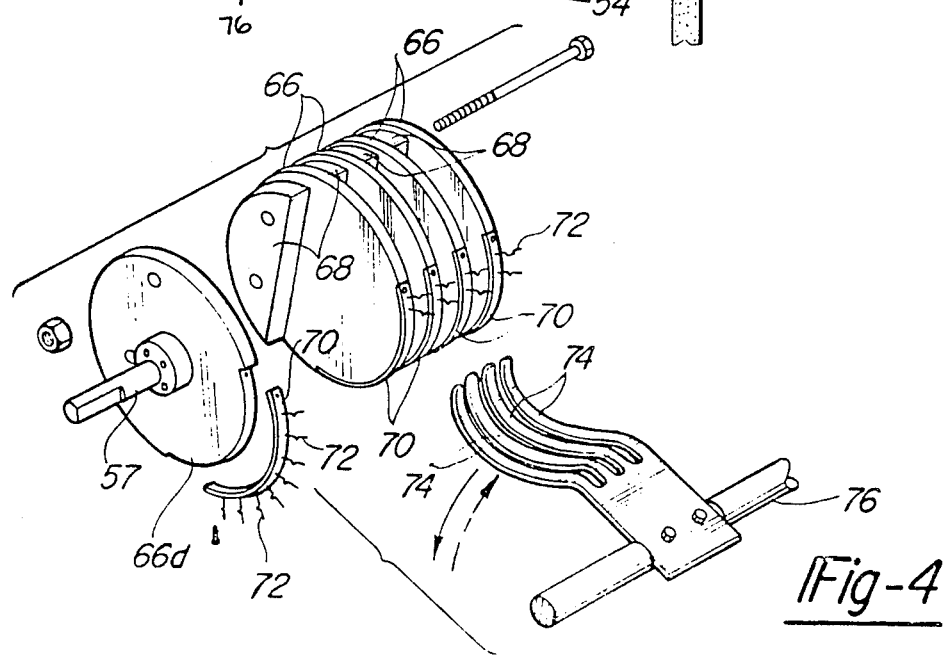
FIG. 4 is an exploded view, in perspective and at an enlarged scale, illustrating a portion of the bread slice separating and transfer device of FIGS. 1 through 3.

As is shown in FIGS. 4 and 5, each secondary rotatable member is made up of a plurality of generally circular disks 66 which are connected to less than semi-circular spacers 68 that are stacked and positioned in an alternating relationship with the disks 66, entirely on one side of the diameter of each of the disks 66, thereby leaving a space between adjacent disks 66 which occupies a substantial portion, preferably at least approximately half, of the surface area of each of such disks 66, for purposes which will subsequently be described more fully. An arcuate peripheral surface portion 66d of each of the disks 66 is radially inwardly offset, and, in each assembled secondary rotatable member 54, the space 66d is occupied by an arcuate member 70 which carries a plurality of generally radially extending pins 72 that extend outwardly from such arcuate member 70. Preferably the pins 72 are a generally U-shaped with the bight portion of each U-shaped pair of pins being disposed on the radial innermost surface of the arcuate member 70 to help secure the pins 72 to the arcuate member 70. Each secondary rotatable member 54 is so positioned relative to the primary rotatable member 30 that the arcuate members 70 and the pins 72 that are carried thereby face radially outwardly at the nine o'clock pick-up station and at the six o'clock discharge station, and the pick-up of each bread slice B at the pick-up station is effected by advancing the sliced loaf L of bread so that the leading slice B is implied onto the pins 72 of the secondary rotatable 54 at the pick-up station, while the absolute tangential velocity of such pins 72 is substantially zero, as heretofor explained, thus ensuring that the relative motion between the face of the slice of bread B that is being picked up or discharged by the pins 72, and such pins, will be parallel to the radial extent of the pins, or normally of the face of the slice of bread B, to avoid tearing of the slice of bread B. The discharge of the slice of bread B at the six o'clock discharge station is facilitated by means of an oscillatable set of discharge fingers 74 which are connected to a common oscillatable shaft 76 and which oscillate freely in the spaces between the disks 66 of the secondary rotatable members 54 to positively strip a slice of bread B from the pins 72 of the secondary rotatable member 54 at the six o'clock discharge station, again, while the absolute tangential velocity of the pins 72 of the secondary rotatable member 54 at such six o'clock station is substantially zero. The oscillation of the oscillatable shaft 76 is effected by pivotally attaching it to a link 78 which, in turn, is pivotally attached eccentrically to a roller 80 which is driven in synchronization with the primary rotatable member 30 by a non-slip, cogged timing belt 82. The contact with the slice of bread B that is being stripped from the pins 72 by the fingers 74 is simultaneous at a plurality of locations across the slice of bread, thus, resulting in low and evenly distributed contact loads on the slice of bread during discharge to avoid crushing or other damage to the slice of bread.

While the invention has been specifically described in regard to the handling of sliced bread in loaves, it is also contemplated that the invention may be used to advantage in the handling of other soft, spongy, planar materials in stacks, for example, synthetic sponges of the type that are sold individually packaged for household use.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. Apparatus for separating slices of bread in a loaf of sliced bread and for transferring the slices of bread in sequence, the slices of bread including a leading slice with a leading face, said apparatus comprising:

infeed conveying means for sequentially presenting the slices of bread in the loaf of sliced bread at a first location;

drive means for driving said infeed conveying means, said drive means being adapted to present the leading face of the leading slice at said first location, said drive means including control means for controlling the operation of said drive means to present the leading face of the leading slice at said first location, and separating and transfer means for sequentially picking up the slices of bread at said first location and for discharging the slices of bread at a second location which is disposed away from said first location, said separating and transfer means comprising;

a primary rotatable means that is rotatable in a given direction with respect to the face of a clock about a generally horizontally extending axis extending centrally through said primary rotatable means, said primary rotatable means being rotatable in a circular arc that includes a first portion disposed adjacent to said first location and a second portion disposed adjacent to said second location;

means for rotating said primary rotatable means about said generally horizontally extending axis in said given direction;

a plurality of secondary rotatable means carried by said primary rotatable means and rotatable therewith, each of said secondary rotatable means having a generally horizontally extending central axis which is spaced radially outwardly from and is disposed parallel to said generally horizontally extending axis of said primary rotatable means, each of said secondary rotatable means further being rotatable with respect to said primary rotatable means around its generally horizontally extending central axis in a direction, with respect to the face of a clock, which is the opposite direction to said given direction;

said plurality of secondary rotatable means being circumferentially substantially evenly spaced around said primary rotatable means and radially substantially equidistantly spaced from said generally horizontally extending axis of primary rotatable means; and means for rotating each of said secondary rotatable means about its generally horizontally extending central axis in said opposite direction such that a portion of said each of said secondary rotatable means has an absolute velocity which is substantially equal to zero at said first location and an absolute velocity which is substantially equal zero to at said second location; and bread slice engaging means carried by said each of said secondary rotatable means adjacent said portion of said each of said secondary rotatable means for engaging a slice of bread at said first location when said portion of said each of said secondary rotatable means has an absolute velocity which is substantially equal to zero.

2. Apparatus according to claim 1 wherein said bread slice engaging means comprises a plurality of spaced apart pin means, said plurality of spaced apart pin means serving to engage a slice of bread by having the slice of bread impaled onto said plurality of spaced apart pin means.

3. Apparatus according to claim 2 wherein said bread slice engaging means further comprises an arcuate member and wherein each of said plurality of pin means is non-retractibly positioned with respect to said arcuate member.

4. Apparatus according to claim 3 wherein each of said plurality of pin means comprises a generally U-shaped member having a pair of legs and a bight extending between said pair of legs, said bight being positioned radially interiorly of said arcuate member.

5. Apparatus according to claim 1 wherein said drive means for driving said infeed conveyor means comprises an intermittently driven stepping motor.

6. Apparatus according to claim 1 wherein said infeed conveying means is inclined downwardly at a small angle with respect to a horizontal direction in a direction extending toward said first location.

7. Apparatus according to claim 1 wherein said second location is positioned, with respect to the face of a clock, approximately at six o'clock and wherein said first location is positioned, with respect to the face of the clock, approximately three hours before said second location in said given direction of rotation.

8. Apparatus according to claim 7 wherein said given direction of rotation is counter-clockwise and wherein said first location is approximately at nine o'clock.

9. A method for separating soft, spongy, planar objects in a stack of such objects and for transferring the objects in sequence, said method comprising the steps:

sequentially presenting the objects in a stack at a first location;

providing a primary rotatable member that is rotatable about a generally horizontally extending axis, said generally horizontally extending axis extending centrally through said primary rotatable member, rotating said primary rotatable member in a given direction with respect to the face of the clock about said generally horizontally extending axis in a circular arc that includes a first portion adjacent to said first location and a second portion;

providing a plurality of secondary rotatable members carried by said primary rotatable member, each of said secondary rotatable members being rotatable with respect to said primary rotatable member and having a generally horizontally extending central axis which is spaced from and disposed parallel to said generally horizontally extending axis of said primary rotatable member, said plurality of secondary rotatable members being circumferentially substantially evenly spaced around said primary rotatable member and being radially substantially equidistantly spaced from said generally horizontally extending axis of said primary member;

rotating each of said secondary rotatable members relative to said primary rotatable member about said central axis of said each of said secondary rotatable member in a direction, with respect to the face of a clock, that is opposite to the direction of rotation of said primary rotatable member;

engaging one of the objects in the stack by one of the plurality of secondary rotatable members when said one of said plurality of secondary rotatable members is adjacent to said first portion of said circular arc; and disengaging the one of the objects from said one of said plurality of secondary rotatable members when said one of said plurality of secondary rotatable members is adjacent to said second portion of said circular arc.

10. A method according to claim 9 wherein each of said secondary rotatable members is provided with pin means extending generally radially outwardly therefrom, wherein each of said secondary rotatable members is rotated relative to said primary rotatable member such that the absolute velocity of the pin means of each of said secondary rotatable members is substantially equal to zero at said first portion of said circular arc and at said second portion of said circular arc, and wherein the engaging of the one of the objects by said one of said secondary rotatable members is by impaling the one of the objects on said pin means of said one of said plurality of secondary rotatable members.

11. The method according to claim 9 wherein the soft, spongy, planar objects in a stack of such soft, spongy, planar objects are slices of bread in a loaf of bread slices.

12. The method according to claim 9 wherein the objects in the stack of such objects are sequentially presented at the first location by intermittently advancing the stack of such objects toward the first location.

13. The method according to claim 12 wherein the stack of such objects are intermittently advanced toward the first location along a path of travel that is inclined downwardly from a horizontal direction at a small angle and wherein each of the objects in the stack of such objects is in a position wherein it extends normally of the path of travel as it is advanced toward the first location.

14. The method according to claim 9 wherein said second portion of said circular arc is positioned, with respect to the face of the clock, approximately at six o'clock and wherein said first portion of said circular arc is positioned, with respect to the face of a clock, approximately three hours before said second portion of said given direction of rotation.

15. The method according to claim 14 wherein said given direction of rotation is counterclockwise and wherein said first portion of said circular arc is positioned approximately at nine o'clock.

16. The method according to claim 9 wherein the stack of planar objects includes a leading planar object and wherein the leading planar object includes a leading face, and further comprising the step of controlling the presenting of the objects in the stack at the first location to ensure that the leading face of the leading planar object is presented at the first location.

17. Apparatus for separating slices of bread in a loaf of sliced bread and for transferring the slices of bread in sequence, said apparatus comprising:
  infeed conveying means for sequentially presenting the slices of bread in the loaf of sliced bread at a first location;
  drive means for driving said infeed conveying means;
  separating and transfer means for sequentially picking up the slices of bread at said first location and for discharging the slices of bread at a second location which is disposed away from said first location, said separating and transfer means comprising;
    a primary rotatable means that is rotatable in a given direction with respect to the face of a clock about a generally horizontally extending axis extending centrally through said primary rotatable means, said primary rotatable means being rotatable in a circular arc that includes a first portion disposed adjacent to said first location and a second portion disposed adjacent to said second location;
    means for rotating said primary rotatable means about said generally horizontally extending axis in said given direction;
    a plurality of secondary rotatable means carried by said primary rotatable means and rotatable therewith, each of said secondary rotatable means having a generally horizontally extending central axis which is spaced radially outwardly from and is disposed parallel to said generally horizontally extending axis of said primary rotatable means, each of said secondary rotatable means comprising slot means therein and further being rotatable with respect to said primary rotatable means around its generally horizontally extending central axis in a direction, with respect to the face of a clock, which is the opposite direction to said given direction;
    said plurality of secondary rotatable means being circumferentially substantially evenly spaced around said primary rotatable means and radially substantially equidistantly spaced from said generally horizontally extending axis of primary rotatable means;
    means for rotating each of said secondary rotatable means about its generally horizontally extending central axis in said opposite direction such that a portion of said each of said secondary rotatable means has an absolute velocity which is substantially equal to zero at said first location and an absolute velocity which is substantially equal to zero to at said second location; and
    oscillatable stripping means adjacent said second location and receivable in said slot means of each of said secondary rotatable means when said each of said secondary rotatable means is adjacent said second location; and
    means for oscillating said oscillatable stripping means for stripping a slice of bread from said portion of said each of said secondary rotatable means at said second location when said portion of said each of said secondary rotatable means has an absolute velocity which is substantially equal to zero; and
    bread slice engaging means carried by said each of said secondary rotatable means adjacent said portion of said each of said secondary rotatable means for engaging a slice of bread at said first location when said portion of said each of said secondary rotatable means has an absolue velocity which is substantially equal to zero.

18. Apparatus according to claim 17 wherein said slot means of said each of said secondary rotatable means comprises a plurality of slots spaced apart from one another in a direction extending parallel to said generally horizontally extending central axis of said each of said secondary rotatable means, and wherein said oscillatable stripping means receivable in said slot means comprises a plurality of fingers, said plurality of fingers being interleaveably receivable in said plurality of slots, said plurality of fingers being oscillatable in unison to substantially simultaneously engage a slice of bread being stripped from said portion of said each of said secondary rotatable means at a plurality of spaced apart locations.

19. Apparatus for separating slices of bread in a loaf of sliced bread and for transferring the slices of bread in sequence, said apparatus comprising:
  infeed conveying means for sequentially presenting the slices of bread in the loaf of sliced bread at a first location;
  drive means for driving said infeed conveying means;
  separating and transfer means for sequentially picking up the slices of bread at said first location and for discharging the slices of bread at a second location which is disposed away from said first location; said separating and transfer means comprising:
    a primary rotatable means that is rotatable in a given direction with respect to the face of a clock about a generally horizontally extending axis extending centrally through said primary rotatable means, said primary rotatable means being rotatable in a circular arc that includes a first portion disposed adjacent to said first location and a second portion disposed adjacent to said second location;
    means for rotating said primary rotatable means about said generally horizontally extending axis in said given direction, said means for rotating comprising;

first belt drive means actuated by the rotation of said primary rotatable means in said given direction for rotating one of said plurality of secondary rotatable means; and second belt drive means actuated by the rotation of said one of said plurality of secondary rotatable means for rotating the other of said plurality of secondary rotatable means;

a plurality of secondary rotatable means carried by said primary rotatable means and rotatable therewith, each of said secondary rotatable means having a generally horizontally extending central axis which is spaced radially outwardly from and is disposed parallel to said generally horizontally extending axis of said primary rotatable means, each of said secondary rotatable means comprising slot means therein and further being rotatable with respect to said primary rotatable means around its generally horizontally extending central axis in a direction, with respect to the face of a clock, which is the opposite direction to said given direction;

said plurality of secondary rotatable means being circumferentially substantially evenly spaced around said primary rotatable means and radially substantially, equidistantly spaced from said generally horizontally extending axis of primary rotatable means; and means for rotating each of said secondary rotatable means about its generally horizontally extending central axis in said opposite direction such that a portion of said each of said secondary rotatable means has an absolute velocity which is substantially equal to zero at said first location and an absolute velocity which is substantially equal zero to at said second location; and bread slice engaging means carried by said each of said secondary rotatable means adjacent said portion of said each of said secondary rotatable means for engaging a slice of bread at said first location when said portion of said each of said secondary rotatable means has an absolute velocity which is substantially equal to zero.

20. Apparatus according to claim 19 wherein said first belt means comprises a pulley attached to said one of said plurality of secondary rotatable means and rotatable therewith; a second non-rotatable pulley positioned coaxially with respect to said generally horizontally extending axis of said primary rotatable means; and a belt trained around said pulley and said second pulley.

21. Apparatus according to claim 20 wherein said belt is a non-slip, cogged timing belt.

22. Apparatus according to claim 19 wherein said second belt drive means comprises a plurality of pulley means, each of said plurality of secondary rotatable means having one of said plurality of pulley means attached thereto and rotatable therewith, and belt means trained around each of said plurality of pulley means.

23. Apparatus according to claim 22 wherein said belt means comprises a non-slip, cogged timing belt.

24. A method for separating soft, spongy, planar objects in a stack of such objects and for transferring the objects in sequence, said method comprising the steps:

sequentially presenting the objects in the stack at a first location;

providing a primary rotatable member that is rotatable about a generally horizontally extending axis, said generally horizontally extending axis extending centrally through said primary rotatable member, rotating said primary rotatable member in a given direction with respect to the face of the clock about said generally horizontally extending axis in a circular arc that includes a first portion adjacent to said first location and a second portion;

providing a plurality of secondary rotatable members carried by said primary rotatable member, each of said secondary rotatable members being provided with slots therein and being rotatable with respect to said primary rotatable member and having a generally horizontally extending central axis which is spaced from and disposed parallel to said generally horizontally extending axis of said primary rotatable member, said plurality of secondary rotatable members being circumferentially substantially evenly spaced around said primary rotatable member and being radially substantially equidistantly spaced from said generally horizontally extending axis of said primary member;

rotating each of said secondary rotatable members relative to said primary rotatable member about said central axis of said each of said secondary rotatable member in a direction, with respect to the case of a clock, that is opposite to the direction of rotation of said primary rotatable member;

engaging one of the objects in the stack by one of said plurality of secondary rotatable members when said one of said plurality of secondary rotatable member is adjacent to said first portion of said circular arc; and disengaging said one of the objects from said one of said plurality of secondary rotatable members when said one of said plurality of secondary rotatable members is adjacent to said second portion of said circular arc, the disengaging of said one of the objects form said one of said secondary rotatable members including the steps of;

providing oscillatable stripping means adjacent said second portion of said circular arc; and oscillating said oscillatable stripping means through said slots in said secondary rotatable members to strip the one of the objects from said one of said secondary rotatable members.

* * * * *